(12) United States Patent
Lefebvre et al.

(10) Patent No.: US 10,597,105 B2
(45) Date of Patent: Mar. 24, 2020

(54) SNOWMOBILE FUEL TANK AND FRAME

(71) Applicant: BOMBARDIER RECREATIONAL PRODUCTS INC., Valcourt (CA)

(72) Inventors: Michel Lefebvre, Valcourt (CA); Mathieu Gauthier, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 142 days.

(21) Appl. No.: 15/509,889

(22) PCT Filed: Sep. 9, 2014

(86) PCT No.: PCT/IB2014/064341
§ 371 (c)(1),
(2) Date: Mar. 9, 2017

(87) PCT Pub. No.: WO2016/038418
PCT Pub. Date: Mar. 17, 2016

(65) Prior Publication Data
US 2017/0305487 A1    Oct. 26, 2017

(51) Int. Cl.
*B62J 35/00*    (2006.01)
*B62M 27/02*    (2006.01)

(52) U.S. Cl.
CPC ............. *B62J 35/00* (2013.01); *B62M 27/02* (2013.01); *B62M 2027/023* (2013.01); *B62M 2027/026* (2013.01); *B62M 2027/028* (2013.01)

(58) Field of Classification Search
CPC .. B62J 35/00; B62M 27/02; B62M 2027/023; B62M 2027/026; B62M 2027/028
See application file for complete search history.

(56) References Cited

U.S. PATENT DOCUMENTS

| | | | |
|---|---|---|---|
| 4,175,630 A | * | 11/1979 | Fleisher ................... B62J 35/00 123/198 D |
| 5,975,230 A | | 11/1999 | Bourget |

(Continued)

FOREIGN PATENT DOCUMENTS

RU    2517918 C2    6/2014

OTHER PUBLICATIONS

English Machine Translation of RU2517918C2 retrieved from http://translationportal.epo.org/ on Jun. 18, 2018.
(Continued)

*Primary Examiner* — Joseph M Rocca
*Assistant Examiner* — Michael R Stabley
(74) *Attorney, Agent, or Firm* — BCF LLP

(57) ABSTRACT

A snowmobile having a frame, a seat, at least one ski, a front suspension assembly connected to the frame and the at least one ski, a rear suspension assembly connected to the frame and to an endless track and an engine operatively connected to the frame and the endless track. The frame includes a longitudinal tunnel, an engine cradle connected thereto and extending forwardly therefrom. A front suspension module connected to the engine cradle and extending forwardly therefrom, is connected to the front suspension assembly. A forward support, connected either to the front suspension module or the engine cradle, extends rearwardly and upwardly therefrom. A fuel tank connected to the tunnel extends forwardly and upwardly from the tunnel to the forward support so as to form a structural connection between the tunnel and the forward support for transmitting loads therebetween. Frames for the snowmobile are also disclosed.

17 Claims, 13 Drawing Sheets

(56) References Cited

U.S. PATENT DOCUMENTS

| | | |
|---|---|---|
| 6,186,550 B1 | 2/2001 | Horii et al. |
| 6,484,837 B1 | 11/2002 | Buell et al. |
| 6,516,910 B2 | 2/2003 | Buell et al. |
| 6,837,328 B2 | 1/2005 | Neugebauer et al. |
| 7,014,004 B2 | 3/2006 | Tou |
| 7,156,067 B1 | 1/2007 | Gottschalk |
| 7,367,418 B2 | 5/2008 | Edie |
| 7,469,764 B2 | 12/2008 | Girouard et al. |
| 7,690,467 B2 | 4/2010 | Sheahan et al. |
| 7,926,607 B2 | 4/2011 | Seiter |
| 7,934,738 B2 | 5/2011 | Prielinger et al. |
| 7,963,358 B2 | 6/2011 | Buell |
| 7,975,799 B2 | 7/2011 | James et al. |
| 7,980,629 B2 | 7/2011 | Bedard |
| 9,174,702 B1* | 11/2015 | Gauthier ................. B62M 27/02 |
| 9,352,801 B2* | 5/2016 | Makitalo ................. B62M 27/02 |
| 2002/0020573 A1 | 2/2002 | Fournier et al. |
| 2002/0112909 A1 | 8/2002 | Nishijima |
| 2003/0029663 A1 | 2/2003 | Etou |
| 2008/0142287 A1 | 6/2008 | Simmons et al. |
| 2008/0185203 A1 | 8/2008 | Matsudo |
| 2008/0185204 A1 | 8/2008 | Matsudo |
| 2009/0206626 A1 | 8/2009 | Bedard |
| 2009/0211827 A1 | 8/2009 | Watson |
| 2010/0059978 A1 | 3/2010 | Yamada |
| 2010/0193275 A1 | 8/2010 | Song |
| 2011/0192667 A1 | 8/2011 | Conn et al. |
| 2013/0206494 A1* | 8/2013 | Hedlund ................. B62M 27/02 180/182 |
| 2015/0068827 A1* | 3/2015 | Makitalo ................. B62M 27/02 180/190 |

OTHER PUBLICATIONS

International Search Report of PCT/IB2014/064341; John Nguyen; dated Feb. 18, 2015.

DOOTalk Forums; C3 XP and XR Carbon Fiber Chassis; Aug. 11, 2009; retrieved from http://www.dootalk.com/forums/topic/322220-c3-xp-and-xr-carbon-fiber-chassis/ on Mar. 7, 2017.

DOOTalk Forums; Carbon Fiber Chassis—1200/XP; Jun. 11, 2009; retrieved from http://www.dootalk.com/forums/topic/317874-carbon-tiber-chassis-1200xp/?forcePrint=1&_k=880ea6a14ea49e853634fbdc5015a024 on Mar. 7, 2017.

C3 PowerSports; XM/XP/XR Carbon Fiber Chassis; 2017; retrieved from https://c3powersports.com/products/xmxpxr-carbon-fiber-chassis-discontinued on Mar. 7, 2017.

* cited by examiner

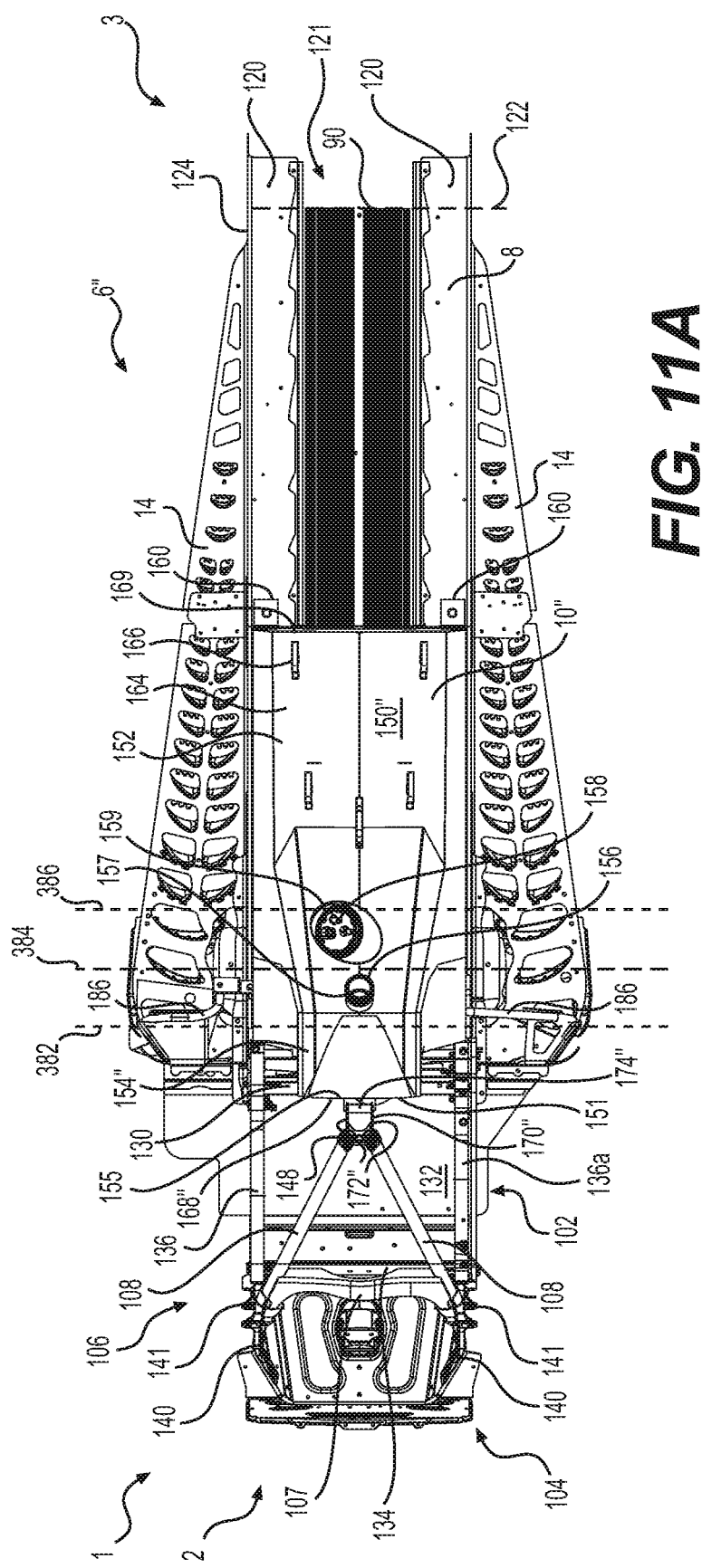

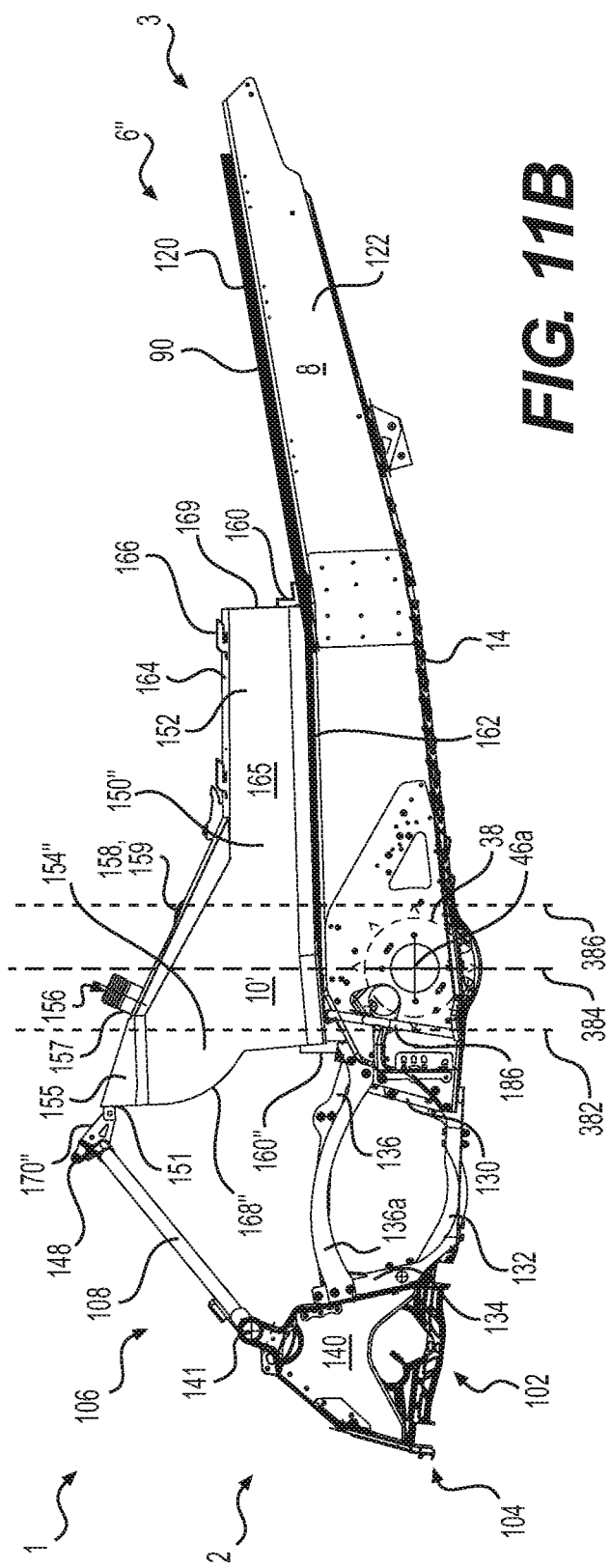

SNOWMOBILE FUEL TANK AND FRAME

FIELD OF THE INVENTION

The present invention relates generally to snowmobiles, and more specifically, to frames for snowmobiles.

BACKGROUND

Snowmobiles are designed for travel on groomed trails as well as off-trail areas, and for different uses such as recreational purposes or for carrying loads. Snowmobiles are designed to be rugged so that they can withstand loads experienced while driving on different terrains and under different conditions. For improved fuel efficiency and for better handling of a snowmobile in different riding conditions, it is desirable to reduce its weight, without, however, causing any loss in stability. It is also desirable to have a snowmobile structure that can be easily assembled and disassembled for maintenance, repairs and replacement.

SUMMARY

It is an object of the present invention to ameliorate at least some of the inconveniences present in the prior art.

In one aspect, the present provides a snowmobile having a frame, a seat, at least one ski, a front suspension assembly connected to the frame and the at least one ski, a rear suspension assembly connected to the frame and to an endless track and an engine operatively connected to the frame and the endless track. The frame includes a longitudinal tunnel, an engine cradle connected thereto and extending forwardly therefrom. A front suspension module is connected to the engine cradle and extending forwardly therefrom. The front suspension module is connected to the front suspension assembly. A forward support, connected either to the front suspension module or the engine cradle, extends rearwardly and upwardly therefrom. A fuel tank connected to the tunnel extends forwardly and upwardly therefrom to the forward support so as to form a structural connection between the tunnel and the forward support for transmitting loads therebetween.

In another aspect, the fuel tank is removably connected to the tunnel and the forward support.

In yet another aspect, a radiator is housed in the tunnel. The tunnel has an upper surface. A portion of the radiator extends above the upper surface of the tunnel. The fuel tank has a bottom surface. A portion of the bottom surface of the fuel tank is recessed to receive the portion of the radiator extending above the upper surface of the tunnel.

In another aspect, each of the forward support and the fuel tank comprise an upper portion, the forward support and the fuel tank being connected together at their respective upper portions.

In a further aspect, the forward support and the fuel tank are connected together by a steering bracket, the steering bracket receiving therethrough a steering column connected to the at least one ski.

In an additional aspect, the forward support has a left support brace and a right support brace. Each of the left and right support braces is connected to the front suspension module at a lower end. Each of the left and right support braces is connected to the fuel tank at an upper end. The left and right support braces and the fuel tank form a generally pyramidal structure.

In a further aspect, the fuel tank has a fuel container connected to the tunnel and a fuel tank bracket connecting the fuel container to the forward support. S In another aspect, the fuel tank bracket is permanently fixed to the fuel container.

In another aspect, the fuel container comprises a lower portion and a neck portion, the lower portion being connected to the tunnel and the neck portion having the fuel tank bracket connected thereto.

In yet another aspect, the fuel tank bracket has two arms extending between the fuel container and the forward support, the two arms being laterally spaced apart at least in a portion thereof proximate the fuel container.

In an additional aspect, a lateral direction width of the neck portion is smaller than a lateral direction width of the lower portion.

In an additional aspect, the forward support, the fuel tank, the tunnel, the engine cradle and the front suspension module form a generally triangular structure when viewed from a lateral side.

In another aspect, the forward support, the fuel tank, the tunnel, the engine cradle and the front suspension module form a generally pyramidal structure when viewed from above.

In another aspect, the fuel tank further has a fuel inlet disposed longitudinally forward of the seat.

In a further aspect, the fuel tank further has a fuel pump, the fuel pump being disposed longitudinally forward of the seat and longitudinally rearward of the fuel inlet.

In an additional aspect, the fuel tank has a fuel container connected to the tunnel and a fuel tank bracket connecting the fuel container to the forward support. The fuel container has the fuel inlet. The fuel tank bracket is connected to the fuel container longitudinally forward of the fuel inlet.

In another aspect, a drive axle operatively connects the engine to the endless track, the fuel tank bracket is connected to the fuel container longitudinally forward of the drive axle.

In another aspect, the present provides a frame for a snowmobile. The frame includes a tunnel extending longitudinally, and an engine cradle connected to the tunnel and extending forwardly therefrom. A front suspension module is connected to the engine cradle and extending forwardly therefrom. The front suspension module is adapted to connect to a front suspension assembly. A forward support is connected to at least one of the front suspension module and the engine cradle. The forward support extends rearwardly and upwardly from one of the front suspension module and the engine cradle. A fuel tank is connected to the tunnel. The fuel tank extends forwardly and upwardly to connect to the forward support such that loads transmitted through the forward support are directed to the tunnel through the fuel tank.

For purposes of the present application, terms related to spatial orientation when referring to a snowmobile and components in relation to the snowmobile, such as "forward", "rearward", "left", "right", "above" and "below", are as they would be understood by a driver of a snowmobile, with the snowmobile in a straight ahead orientation (i.e. not steered left or right), and in an upright position (i.e. not tilted). The explanations provided above regarding the above terms take precedence over explanations of these terms that may be found in any one of the documents incorporated herein by reference.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 11A is a top plan view of a portion of yet another embodiment of a snowmobile frame; and FIG. 11B is a left side elevation view of a portion of the snowmobile frame of FIG. 11A.

DETAILED DESCRIPTION

Figure 1:
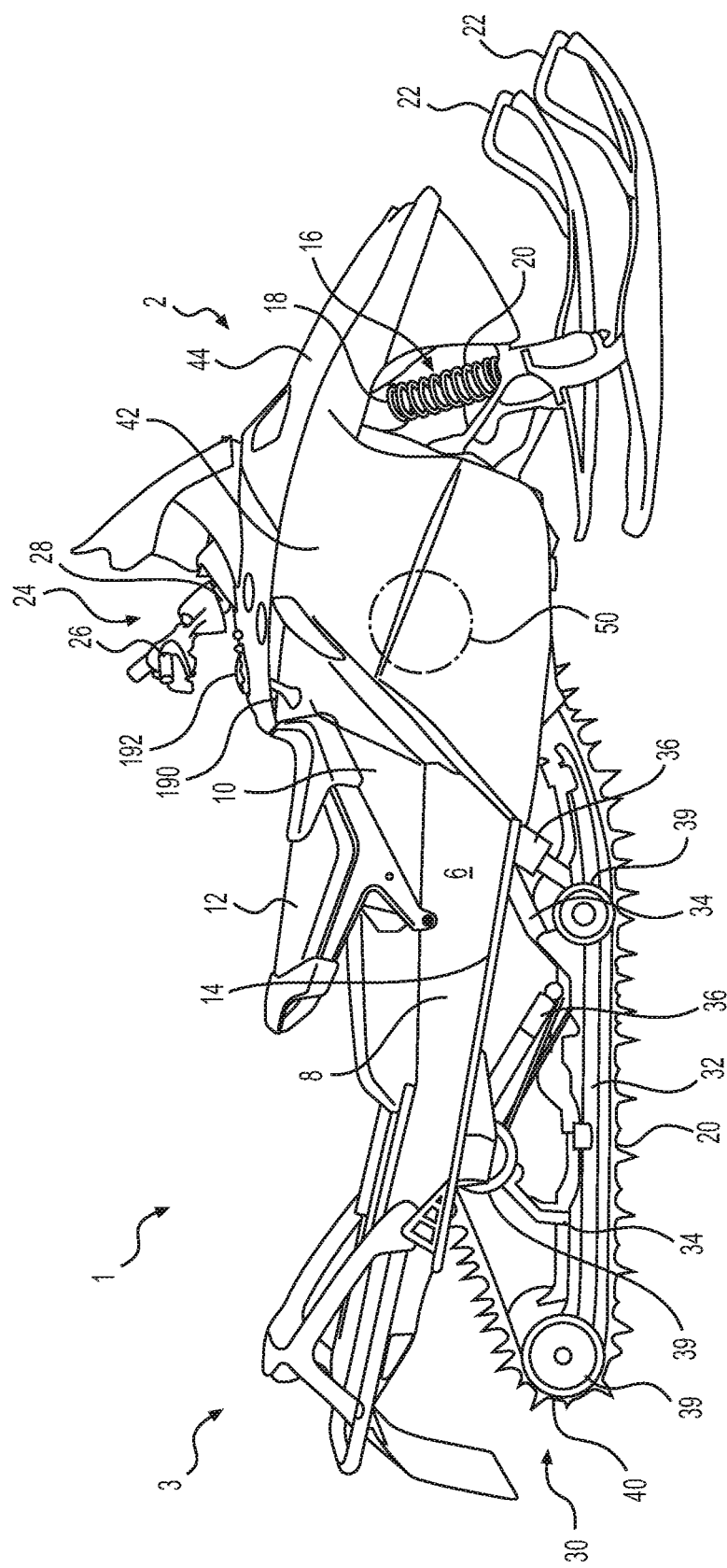
FIG. 1 is a right side elevation view of a snowmobile.
Figure 6:
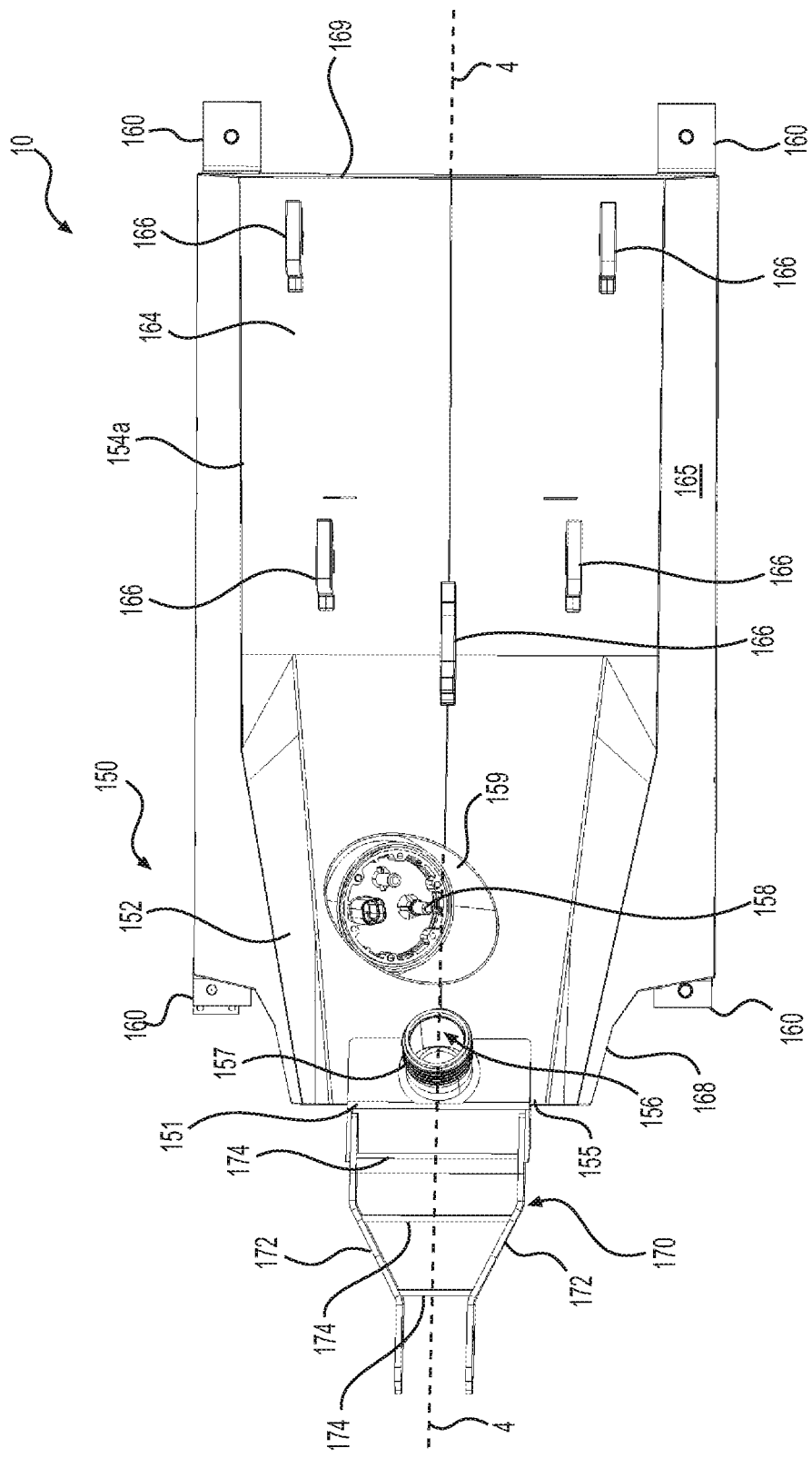
FIG. 6 is a top plan view of the fuel tank of the snowmobile frame of FIG. 4.
Figure 7:
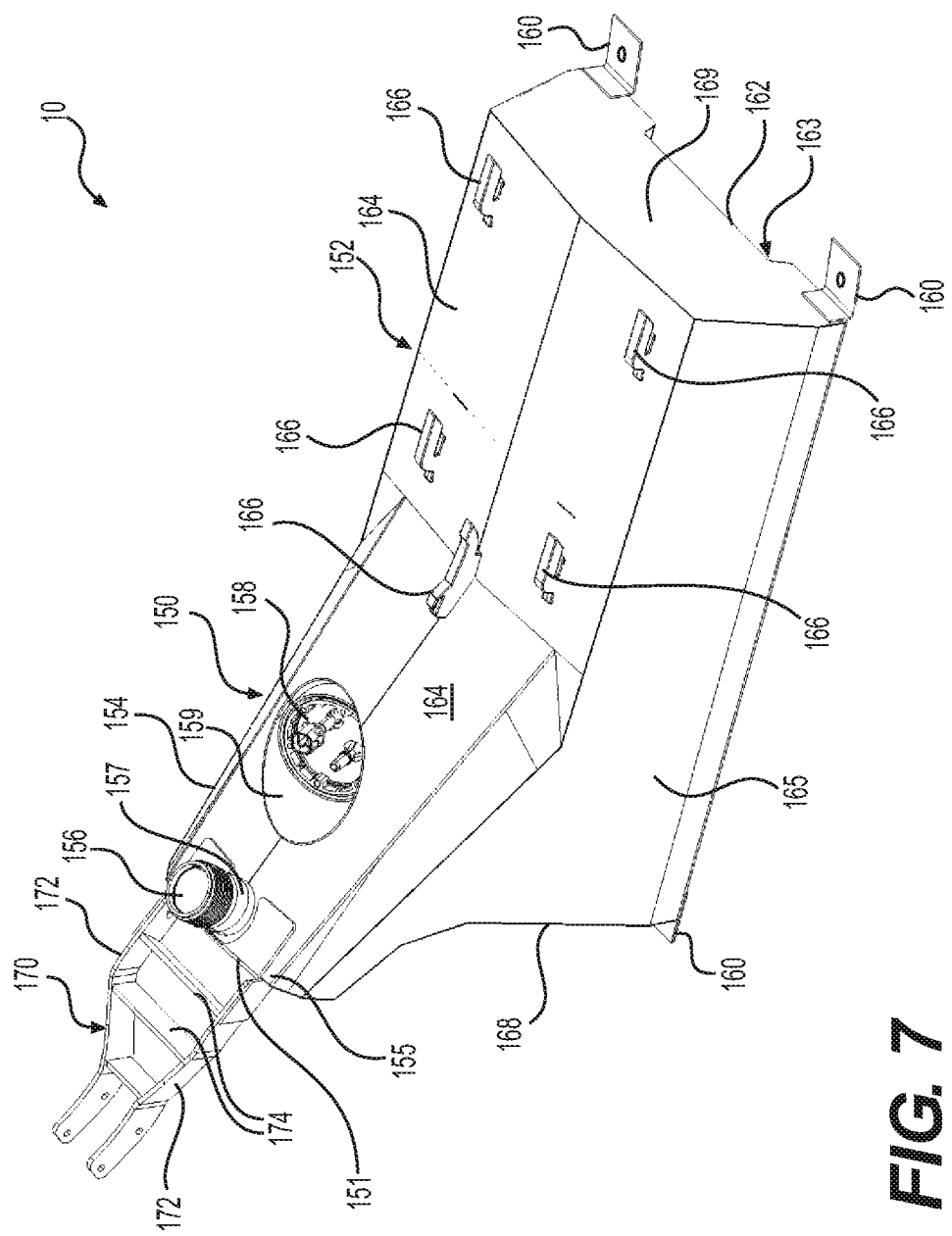
FIG. 7 is a perspective view, taken from a rear, left side of the fuel tank of FIG. 6.
Figure 8:
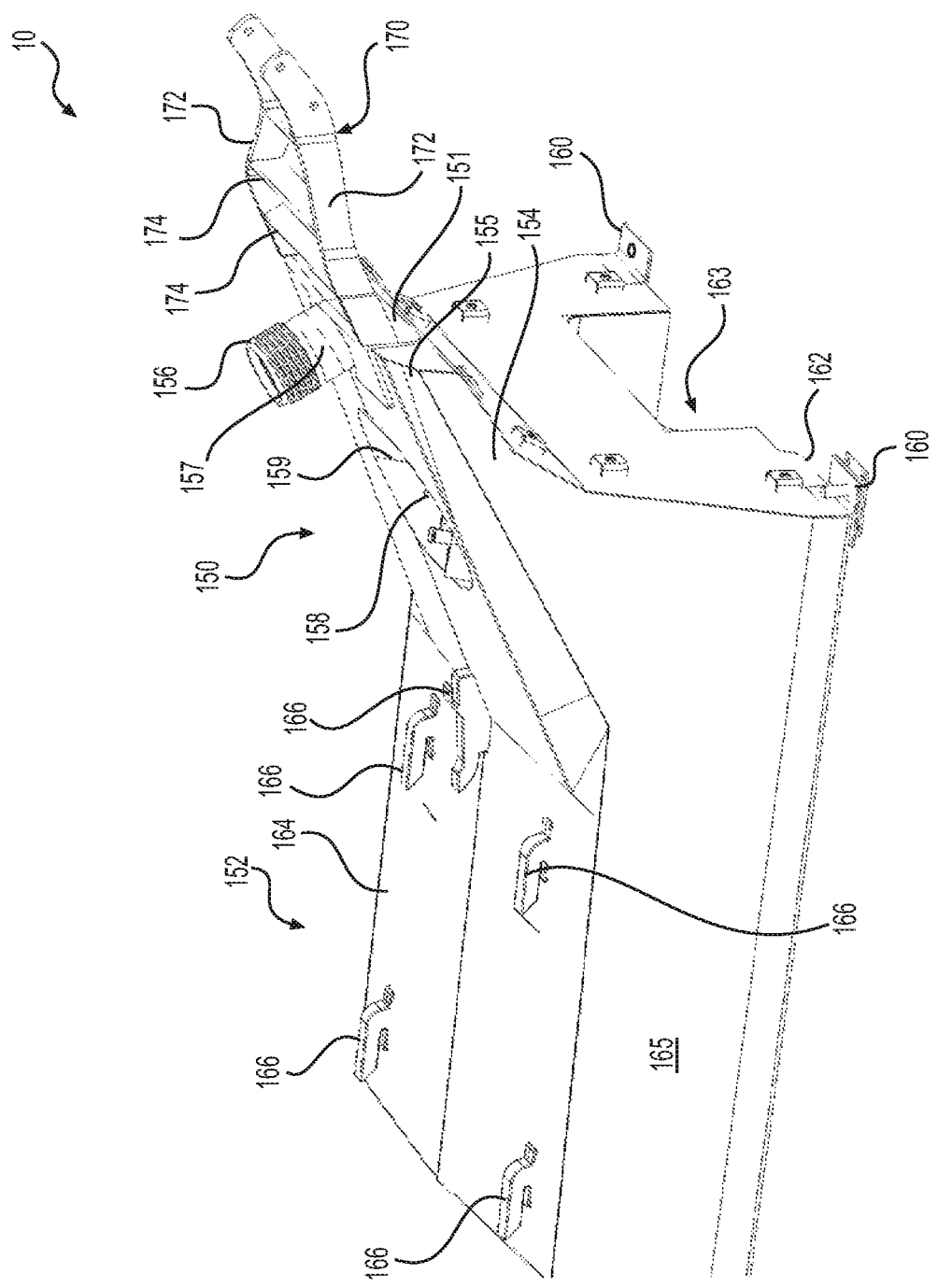
FIG. 8 is a perspective view, taken from a front, right side of the fuel tank of FIG. 6.

With reference to FIG. 1, a snowmobile 1 has a front portion 2 and a rear portion 3, consistently defined with the forward travel direction of the snowmobile 1. The snowmobile 1 has a frame 6 forming the support structure for the snowmobile 1 and its various components. The frame 6 includes a tunnel 8 extending longitudinally along the longitudinal centerline 4 (FIG. 6) of the snowmobile 1. The frame 6, the tunnel 8 and other structural elements of the frame 6 will be discussed in greater detail below.

A fuel tank 10 is mounted on the tunnel 8, and a straddle-seat 12, configured for one rider, is mounted on the fuel tank 10 above the tunnel 8. It is contemplated that the straddle-seat 12 could be configured for two or more riders. A footrest 14 extends laterally outwards from each side of the lower portion of the tunnel 8 to support the rider's feet.

A front suspension assembly 16, including right and left ski legs 18 and associated shock absorbers 20, is attached to the frame 6 at the front portion 2 of the snowmobile 1. A pair of skis 22 is attached to the frame 6 by the ski legs 18 of the front suspension assembly 16. It is contemplated that the snowmobile 1 could have only one ski 22 and one ski leg 18.

A steering assembly 24 including a steering column 28 and a handlebar 26 is operatively connected to the skis 22 for rotating the skis 22 and thereby steering the snowmobile 1. The handlebar 26, disposed forward of the seat 12, can be manipulated by the driver for steering of the snowmobile 1.

In the rear portion 3 of the snowmobile 1, a rear suspension assembly 30 is connected to the tunnel 8. An endless track 40, disposed underneath the tunnel 8 with its bottom surface engaging the ground, is suspended by the rear suspension assembly 30. The rear suspension assembly 30 includes a pair of slide rails 32 engaging the inner surface of the ground engaging portion of the endless track 40. The rear suspension assembly 30 also includes swing arms 34 and shock absorbers 36 connecting the tunnel 8 to the slide rails 32. In addition to the slide rails 32, the inner surfaces of the endless track 40 are engaged by a drive sprocket 38 (FIG. 3A) and idler wheels 39 which keep the endless track 40 tensioned and define the path of travel for the endless track 40. Rotation of the drive sprocket 38 causes the engaged endless track 40 to move, thereby propelling the snowmobile 1 along the ground. The disclosure is not to be limited to any particular configuration of the front and rear suspension assembly. It is contemplated that the front and rear suspension assemblies 16, 30 could be configured differently than as shown herein.

An engine 50 (shown schematically in FIG. 1) is operatively connected to the drive sprocket 38 to rotate the drive sprocket 38 and propel the snowmobile 1 along the ground.

The engine 50 is enclosed and protected by fairings 42 in the front portion 2 of the snowmobile 1. The fairings 42 include a plurality of panels, some of which, including the hood 44, are removable for accessing the engine 50 and other related components for maintenance and repairs. The fairings 42 are also attached to and supported by the frame 6.

Figure 2:
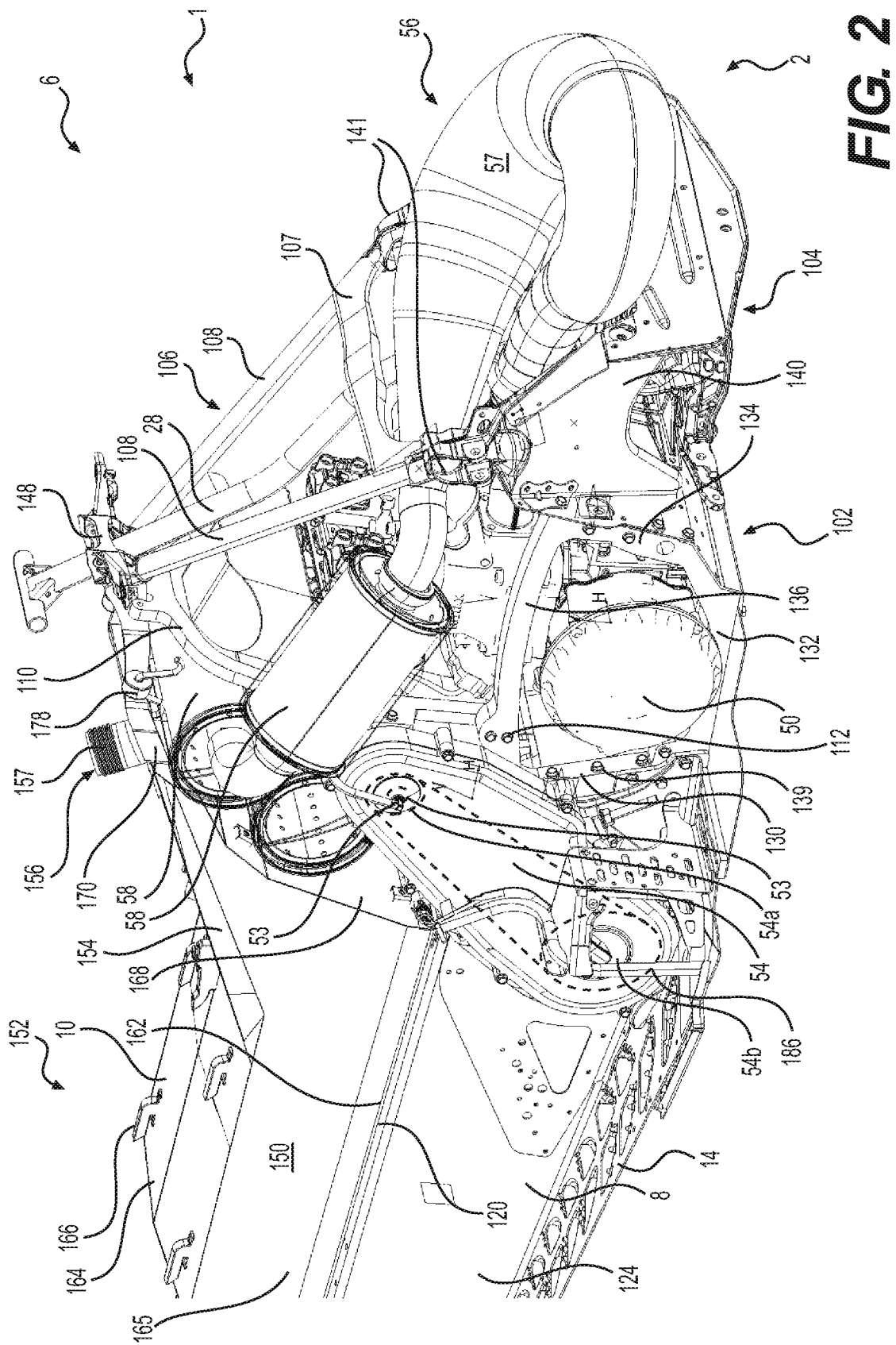
FIG. 2 is a perspective view, taken from a front, right side, of a portion of the snowmobile of FIG. 1 including a snowmobile frame supporting components of a snowmobile powerpack including an engine.
Figure 3A:
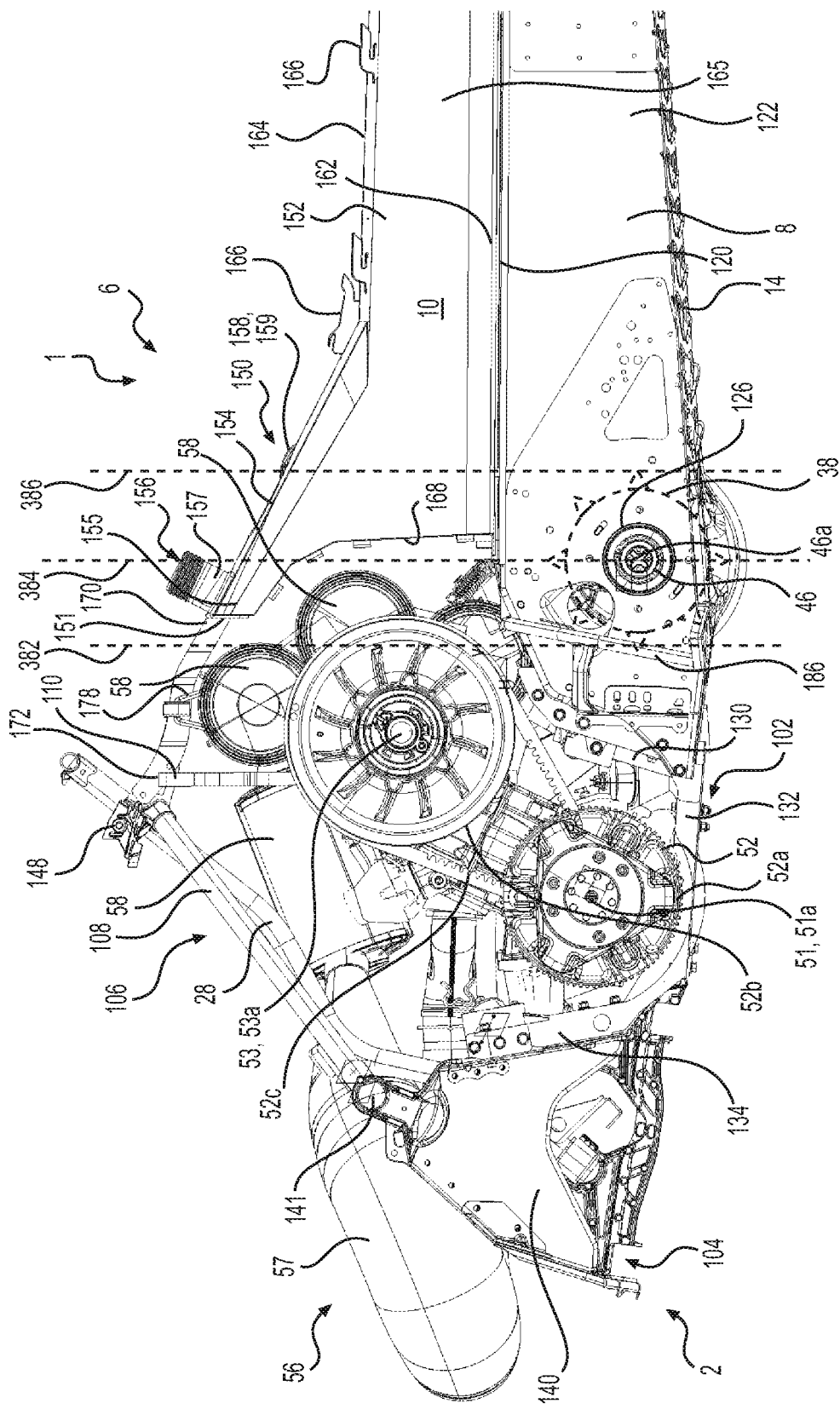
FIG. 3A is a left side elevation view of the snowmobile portion of FIG. 2.

FIGS. 2 and 3A show a power pack for powering the endless drive track 40. The power pack includes, but is not limited to, the engine 50, a transmission system 52, a reduction gear 54, and a countershaft 53.

The engine 50 is a two-cylinder, direct injection, two-stroke internal combustion engine. Alternatively, the engine 50 could be a four-stroke internal combustion engine, a fuel injected engine, a carbureted engine or any other suitable engine or motor capable of propelling of the snowmobile 1. The engine 50 includes two cylinders arranged inline with their cylindrical axes being laterally spaced from each other. An engine output shaft/crankshaft 51 rotates about a horizontal engine output shaft axis 51a.

The transmission 52 is a continuously variable transmission (CVT) including variable diameter pulleys 52a, 52b. It is contemplated that other kinds of transmissions could also be used. The CVT 52 is positioned on the left side of the engine 50. The driving pulley 52a of the CVT 52 is mounted on the output shaft 51 of the engine 50 so as to be rotated by the engine 50. An endless drive belt 52c couples the driving pulley 52a to the driven pulley 52b, and thereby to the engine 50. The driven pulley 52b is thus rotated by the engine 50.

The reduction gear 54 is positioned on the right side of the engine 50. The input sprocket 54a of the reduction gear 54 is coaxially aligned with the driven pulley 52b of the CVT 52. The output shaft 53 of the driven pulley 52b, also known as countershaft 53, is coupled to the input sprocket 54a of the reduction gear 54. The countershaft 53 extends transversely across the snowmobile 1 behind the engine 50. The countershaft 53 rotates about a countershaft axis 53a. The output sprocket 54b of the reduction gear 54 is coaxially aligned with and connected to the front drive axle 46 of the front drive sprocket 38 of the snowmobile 1 for rotating the front drive sprocket(s) 38. The front drive axle 46 and the front drive sprocket(s) 38 rotate about a rotation axis 46*a*.

An exhaust system 56, including and tuned pipe 57 and four mufflers 58, is connected to the engine 50 for expelling gases from the combustion chamber of the engine 50. The tuned pipe 57 extends forwardly from an exhaust port of the engine 50. The tuned pipe 57 then curves rearwardly and upwardly to the first muffler 58 extending longitudinally above the engine 50. The longitudinally extending muffler 58 connects sequentially to each of the remaining three mufflers 58 which extend transversely behind the engine 50. All four mufflers 58 are cylindrical in shape.

Figure 3B:
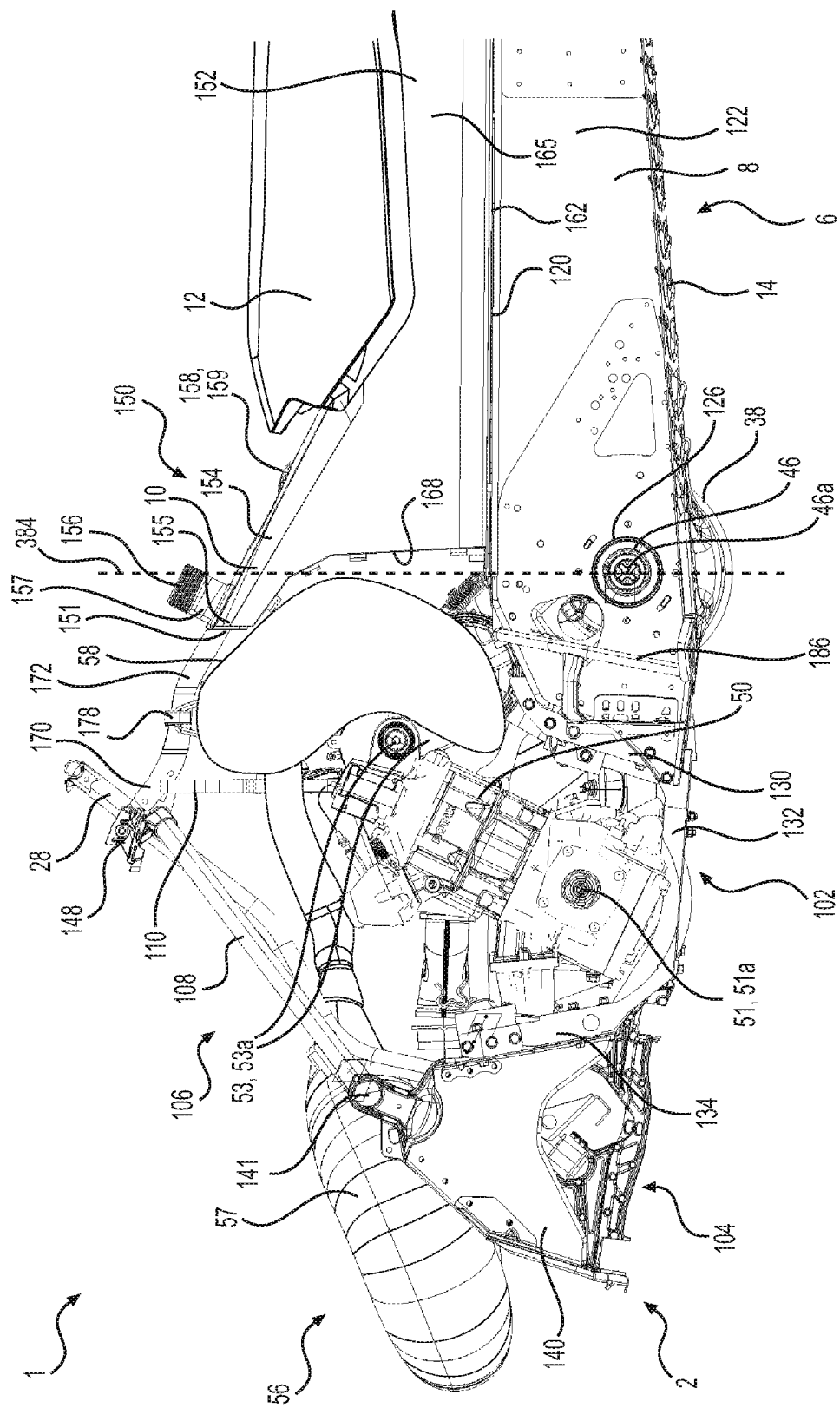
FIG. 3B is a left side elevation view of the snowmobile of FIG. 2 with the transmission system removed for clarity and showing an alternate embodiment of an exhaust system.

FIG. 3B shows a snowmobile 1 having an alternative embodiment of the exhaust system 56. For simplicity, elements that are similar to the corresponding elements of the embodiment of FIGS. 2 and 3A have been labeled with the same reference number and will not be discussed again in detail. The exhaust system 56' has a single kidney-shaped muffler 58' instead of the four cylindrical mufflers 58 described above. The CVT 52 has been removed from FIG. 3B for clarity. The engine 50 is positioned with the cylinders having their cylindrical axes tilted rearward instead of vertically as in FIG. 3A.

The snowmobile 1 and the engine 50 include other components, such as air intake system, an ignition system and the like, needed for the operation of the snowmobile 1 as will be understood by a worker skilled in the art. As it is believed that these components would be readily recognized by one of ordinary skill in the art, further explanation and description of these components will not be provided herein. The disclosure is not intended to be limited to any particular type of the engine 50 and related components of the power pack, or their configuration within the snowmobile 1.

The frame 6 will now be discussed with reference to FIGS. 2 to 5. The frame 6 of the snowmobile 1 includes the tunnel 8, an engine cradle 102, a front suspension module 104, a forward support 106 and the fuel tank 10.

The tunnel 8 generally forms an inverted U-shaped structure. The tunnel 8 includes a top surface 120, a left side surface 122 extending downwardly from the left edge of the top surface 120, and a right side surface 124 extending downwardly from the right edge of the top surface 120.

The top surface 120 of the tunnel 8 is generally horizontal in the front portion of the tunnel 8 and rises gently upwardly and rearwardly in the rear portion of the tunnel 8. It is contemplated that the entire length of the top surface 120 could be horizontal or sloped. It is also contemplated that a portion of the top surface 120 could be curved in a lateral or longitudinal direction. The top surface 120 has a rectangular gap 121 extending longitudinally along the centerline 4. The gap 121 extends from the rear end of the tunnel 8 towards the front end of the tunnel 8. It is contemplated that the gap 121 could shaped and sized differently than as shown. A radiator 90 is disposed in the gap 121 of the top surface 120. The radiator 90 extends above the top surface 120. The engine coolant flowing through the radiator 90 is cooled by the snow being thrown upwards onto the radiator 90 by the track 40 disposed below the tunnel 8.

The left and right side surfaces 122, 124 of the tunnel 8 are shown being disposed parallel to one another forming a tunnel 8 having a generally rectangular shape when viewed from above or behind. It is contemplated that the side surfaces 122, 124 could be disposed at an angle relative to each other to form a trapezoidal shaped tunnel 8 as viewed from above or behind. The front portion of the side surfaces 122, 124 are reinforced for additional rigidity. The left side surface 122 of the tunnel 8 has an opening 126 which receives the front drive axle 46 of the front drive sprocket 38. The bottom edges of the left and right side surfaces 122, 124 rise upwardly and rearwardly towards the top surface 120. The footrests 14 extend laterally outwards from the bottom edges of the respective left and right side surfaces 122, 124. A footrest support 186 connects the front end of each footrest 14 to an upper portion of the front edge of the corresponding side surface 122, 124.

Figure 4:
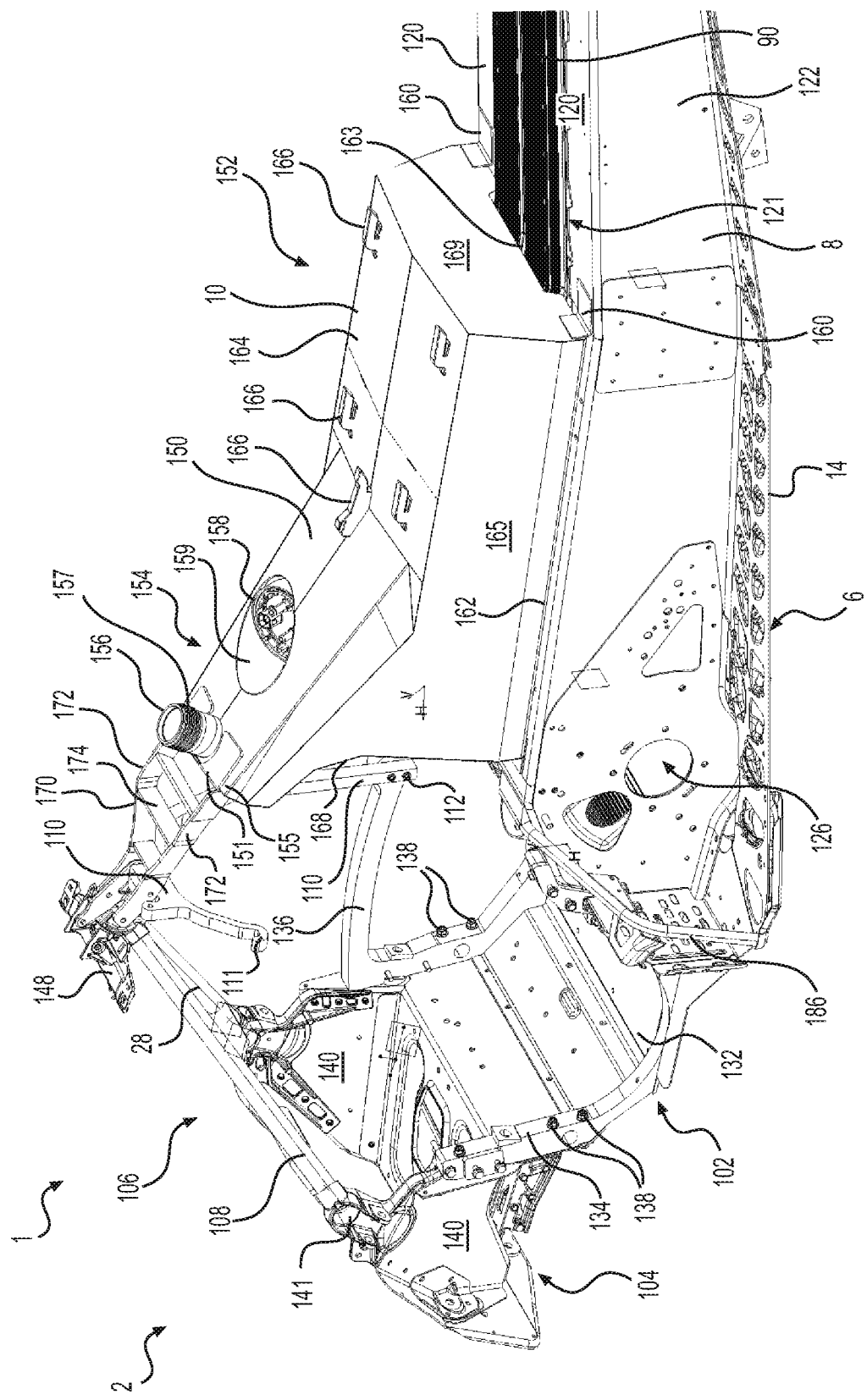
FIG. 4 is a perspective view, taken from a rear, left side, of a portion of the snowmobile frame of FIG. 2.

The engine cradle 102 is attached to the front end 180 of the tunnel 8 and extends forwardly therefrom. In the illustrated embodiment of the engine cradle 102, a generally horizontal bottom portion 132 of the engine cradle 102 extends forwardly from the bottom 184 of the tunnel 8, and a generally vertical front portion 134 rises upwards from the bottom portion 132 of the engine cradle 102. The engine cradle 102 could be configured to support engines other than the engine 50 of the illustrated embodiment. Engine cradles 102 having different shapes and including components different than as described above are therefore also contemplated. The engine 50 can be supported on the bottom portion 132 of the engine cradle 102 or can also be solely and/or simultaneously supported by other areas of the engine cradle 102, tunnel 8 or front suspension module 104. The front suspension module 104, which attaches the front suspension assembly 16 to the snowmobile 1, is attached to the front portion 134 of the engine cradle 102 (by fasteners 138 as seen in FIG. 4). On the right side of the engine cradle 102, as best seen in FIGS. 2 and 4, a generally horizontal upper bar 136 extends between the upper ends of the engine cradle front and rear portions. 134, 130 spaced from the generally horizontal bottom portion 132 in order to provide additional structural rigidity to the engine cradle 102. The left side of the engine cradle 102 may also include a horizontal upper bar 136*a* extending between the front and rear portions, 130 and 134, as shown in the embodiment of the snowmobile 1 of FIG. 10.

The front suspension module 104 is attached to and extends forwardly from the engine cradle 102. The front suspension module 104 includes left and right front suspension mounting brackets 140. Each bracket 140 forms an inverted generally V-shaped structure extending forwardly from the front portion 134 of the engine cradle 102. The corresponding front suspension assembly 16 is attached to each front suspension mounting bracket 140. Other types of suspension mounting brackets are also contemplated to accommodate a different type of front suspension assembly 16. The tuned pipe 57 connected to the engine 50 is supported on the front suspension module 104 and the engine cradle 102.

The forward support 106 includes left and right forward support braces 108 attached to the corresponding left and right front suspension mounting brackets 140 at their upper ends (apex of the inverted V-shaped bracket 140). A laterally extending frame member 107 connects between the lower ends of the two forward support braces 108. The frame member 107 is also connected to the top of the front suspension mounting brackets 140. The apex of the left mounting bracket 140, the left end of the frame member 107 and the bottom end of the left forward support brace are connected together at a common connection point 141 on the left side. Similarly, the apex of the right mounting bracket 140, the right end of the frame member 107 and the bottom end of the right forward support brace are connected together at a common connection point 141 on the right side. The forward support braces 108 extend upwards, rearwards and laterally inwards to a steering bracket 148 positioned above the engine cradle 102. The steering column 28 is movably inserted through the steering bracket 148 between the braces 108. The steering column 28 extends downwards and forwards from the handlebar 26 through the steering bracket 148 to the front suspension assembly 16 (connection not shown in figures) for rotating the skis 22 and steering the snowmobile 1. It is also contemplated that the steering bracket 148 could extend further outwards in the lateral direction than as shown in the figures. The forward support braces 108 are formed as extruded hollow tubes made of metal or other suitably strong materials, however, the disclosure is not intended to be limited to this particular material, assembly method or configuration. For example, it is contemplated that the forward support braces 108 could have a different cross-section or be made by molding or casting. It is also contemplated that the forward support braces 106 may be constructed according to a monocoque or pseudo-monocoque technique instead of having a tubular construction as in the illustrated embodiment.

The fuel tank 10 is mounted on the top surface 120 of the tunnel 8. The fuel tank 10 is removably and rigidly secured to the tunnel 8 as will be discussed below. The fuel tank 10 extends upwards and forwards from the tunnel 8 to connect to the steering bracket 148 and the forward support braces 108. The fuel tank 10 is also removably and rigidly secured to the braces 108 and the steering bracket 148. The fuel tank 10 is constructed of metal, however, it is contemplated that it could be constructed of any suitable material that is strong enough to withstand the forces experienced during operation and appropriate for storing the particular fuel used. This configuration of the frame 6 in which the fuel tank 10 connects the tunnel 8 to the forward support 106 enhances the torsional and structural rigidity of the frame 6 by enabling transfer of torques and forces from the forward support 106 to the tunnel 8. The fuel tank 10 is secured removably to the steering bracket 148 and tunnel 8 in order to allow removal or replacement of the fuel tank 10 for maintenance and repairs.

The fuel tank 10 will now be described in further detail with reference to FIGS. 2 to 8. The fuel tank 10 includes a fuel container 150 and a fuel tank bracket 170 connecting the fuel container 150 to the forward support 106.

The fuel container 150 has a lower portion 152 and a neck portion 154. The neck portion 154 extends upwardly and forwardly from the lower portion 152 to an upper end 155. The fuel container 150 has a bottom surface 162, an upper surface 164, side surfaces 165, a front surface 168 and a rear surface 169.

The neck portion 154 of the fuel container 150 has a fuel inlet 156 for filling fuel in the fuel tank 10. The fuel inlet 156 is defined by the open end of a cylindrical fill tube 157 extending upwardly and rearwardly from the upper surface 164 of the upper portion 150. The fuel inlet 156 is selectively sealed by a removable cover 192 (FIG. 1). The fill tube 157 is disposed longitudinally forward of the seat 12. As can be seen in FIG. 3A, the fill tube 157 is disposed above the drive sprocket 38 so as to have a longitudinal position between a laterally extending vertical plane 382 containing the front edge of the drive sprocket 38 and a laterally extending vertical plane 386 containing the rear edge of the drive sprocket 38. The fill tube 157 is disposed longitudinally forward of a laterally extending vertical plane 384 containing the rotational axis 46a of the drive axle 46. The fill tube 157 is rearward of the footrest support 186. More specifically, the upper end of the footrest support 186 is forward of the fill tube 157.

The neck portion 154 of the fuel container 150 also includes a fuel pump 158 housed in a fuel pump opening 159 disposed rearward of the fuel inlet 156. The fuel pump 158 is used to feed fuel from the fuel tank 10 to the fuel injection system (not shown) of the engine 50. It is contemplated that the fuel pump 158 could be omitted from the fuel tank 10. The fuel pump opening 159 is disposed forward of the seat 12. The fuel pump opening 159 is rearward of the rotational axis 46a of the drive axle 46. A portion of the fuel pump opening 159 is disposed above the drive sprocket 38 so as to be longitudinally between the front and rear edges of the drive sprocket 38. A panel 190 (FIG. 1) of the fairings 42 covers the fuel pump opening 159 and has an opening for the top end of the fill tube 157 and the fuel inlet cover 192.

The upper surface 164 of the fuel container 150 slopes downward and rearward from the top edge of the front surface 168. The rearward portion of the upper surface 164 is flat and horizontal. The seat 12 is positioned on the upper surface 164 so as to cover the horizontally extending portion of the upper surface 164 and an adjacent portion of the sloped upper surface 164 as can be seen in FIG. 3B. It is contemplated that the seat 12 could cover only the horizontally extending portion of the upper surface 164. It is also contemplated that the seat 12 could extend further upwards along the neck portion 154 than as shown in FIG. 3B.

The fuel tank 10 is designed to be used with a removable seat 12. The upper surface 164 of the fuel tank is provided with hooks 166 for attaching to complementary structures (not shown) on the bottom of the removable seat 12, thereby securing the removable seat 12 to the fuel tank 10. U.S. Pat. No. 7,980,629 B2, issued Jul. 19, 2011, the entirety of which is incorporated herein by reference, provides additional details about removable seats, and means for attachment to the fuel tank 10. It is contemplated that the fuel tank 10 could be provided with other means for securing the seat 12 to the fuel tank 10.

The bottom surface 162 of the fuel tank 10 is placed on the top surface 120 of the tunnel 8. The fuel tank 10 is disposed on the front half of the tunnel 8 in the portion where the top surface 120 extends horizontally. The bottom surface 162 is disposed rearward of the front edge of the top surface 120 of the tunnel 8. The longitudinal position of the drive axle rotation axis 46a is forward of the front edge of the bottom surface 162 as can be seen best in FIGS. 3A and 3B.

A recess 163 is formed in the central portion 163 of the bottom surface 162 to accommodate the radiator 90 in the central gap 121 of the upper surface 120 of the tunnel 8, and to facilitate handling of the fuel tank 10 for installation and removal. It is contemplated that the fuel tank 10 could be provided with other structures to facilitate handling. The height of the recess 163 is higher in the front portion than in the rear portion of the fuel tank 10 as can be seen from FIGS. 7 and 8.

The bottom surface 162 of the fuel tank 10 extends to the left and right tunnel surface 122, 124. The side surfaces 165 of the fuel container 150 extend upwards and laterally inwards from the bottom surface 162 to the top surface 164. The fuel container 150 thus has a maximum width at its bottom surface 162, and the maximum width is greater than the width of the gap 121 and approximately the same as the width of the tunnel 8. It is contemplated that the width of the fuel container 150 could be uniform between the top and bottom surfaces 164, 162. It is also contemplated that the width of the fuel container 150 at the bottom surface 162 could be less than or greater than the width of the tunnel 8.

To ensure a structurally rigid attachment between the tunnel 8 and the fuel tank 10, several tunnel attachment brackets 160 are fixed to different locations on the lower portion 152 of the fuel tank 10. In the illustrated embodiment, the fuel tank 10 is fastened to the upper surface 120 of tunnel 8 by bolts (not shown) inserted through holes in brackets 160 and corresponding bolt holes in the upper surface 120 of the tunnel 8 to ensure that loads generated during use are transferred from the forward support braces 108 to the fuel tank 10 and from the fuel tank 10 to the tunnel 8. Each tunnel attachment bracket 160 is an L-shaped bracket, with a vertical portion being fixed to the vertical front or rear surfaces 168, 169 of the fuel tank 10 and a horizontal portion being fastened to the top surface 120 of the tunnel 8. Other attachment means and configurations for removably securing the fuel tank 10 to the tunnel 8 are also contemplated. For example, the fuel tank 10 could be fastened to the right and left surfaces 122, 124 of the tunnel 8 instead of, or in addition to, the upper surface 120 of the tunnel 8. The fuel tank 10 could therefore be provided with tunnel attachment brackets 160 on its left and right side surfaces 165. It is contemplated that the tunnel attachment brackets 160 could be integrally formed with the fuel tank 10, or removably attached to the fuel tank 10, for example by fasteners, instead of being fixedly attached thereto. It is also contemplated that fuel tank 10 could be permanently fixed to the tunnel 8 by welding or bonding with an adhesive. It is also contemplated that the fuel tank could be integrally formed with the tunnel 8.

The front surface 168 extends vertically upwards in the lower portion of the fuel tank 10. The upper portion front surface 168 is disposed forward of the lower portion front surface 168.

In the illustrated embodiment, the fuel tank bracket 170 is welded to the neck portion front surface 168 near the upper end 155 of the neck portion 154 in order to transfer loads from the forward brace(s) 107 to the fuel container 150. It is contemplated that the fuel tank bracket 170 could be fixed directly, indirectly, removably or permanently to the neck portion front surface 168. The fuel tank bracket 170 extends forwards and upwards from the neck portion front surface 168 to the steering bracket 148. The fuel tank bracket 170 includes two arms 172 extending longitudinally on either side of the longitudinal centerline 4 and interconnected by three lateral braces 174 for additional structural rigidity. The arms 172 are secured directly or indirectly to the forward support braces 108 to transfer loads therebetween. The connection 151 between the fuel container 150 and the fuel tank bracket 170 has a longitudinal position between the front and rear edges of the sprocket wheel 38 as can be seen in FIG. 3A in which the sprocket wheel 38 is indicated in dashed lines. In addition, the connection 151 between the fuel container 150 and the fuel tank bracket 170 is disposed at a level higher than the connection 141 between the forward support braces 108 and the front suspension module 104. The connection 151 is also narrower (when viewed from the side as in FIGS. 3A and 3B) than the connection 141.

It is contemplated that the fuel tank bracket 170 could be attached to a different portion of the fuel tank 10 than the neck portion 154 or the front surface 168. For example, the fuel tank bracket 170 could be connected to the side surfaces 165. It is contemplated that the fuel tank bracket 170 could be attached to more than one surface of the fuel container 150. In the illustrated embodiment, the fuel tank bracket 170 is removably attached to the fuel container 150. It is contemplated that the fuel tank bracket 170 could be permanently attached to a surface of the fuel container 150 by means such as welding or bonding. It is also contemplated that the fuel tank bracket 170 could be integrally formed with the fuel container 150.

It is contemplated that the shape and dimensions of the fuel tank 10 could be different than as described herein. For example, the surfaces or portions of the surfaces 162, 164, 168, 169 could be curved instead of being planar. It is also contemplated that the location of the inlet 156, pump 158, and brackets 160 could be different than as described above. It is contemplated that the neck portion 154 of the fuel tank 10 could extend further upwards toward the steering bracket 148 than as shown, and that the fuel tank bracket 160 could be shorter in length than as shown. It is also contemplated that the steering bracket 148 could be directly attached to a surface of the fuel tank 10.

Figure 5:
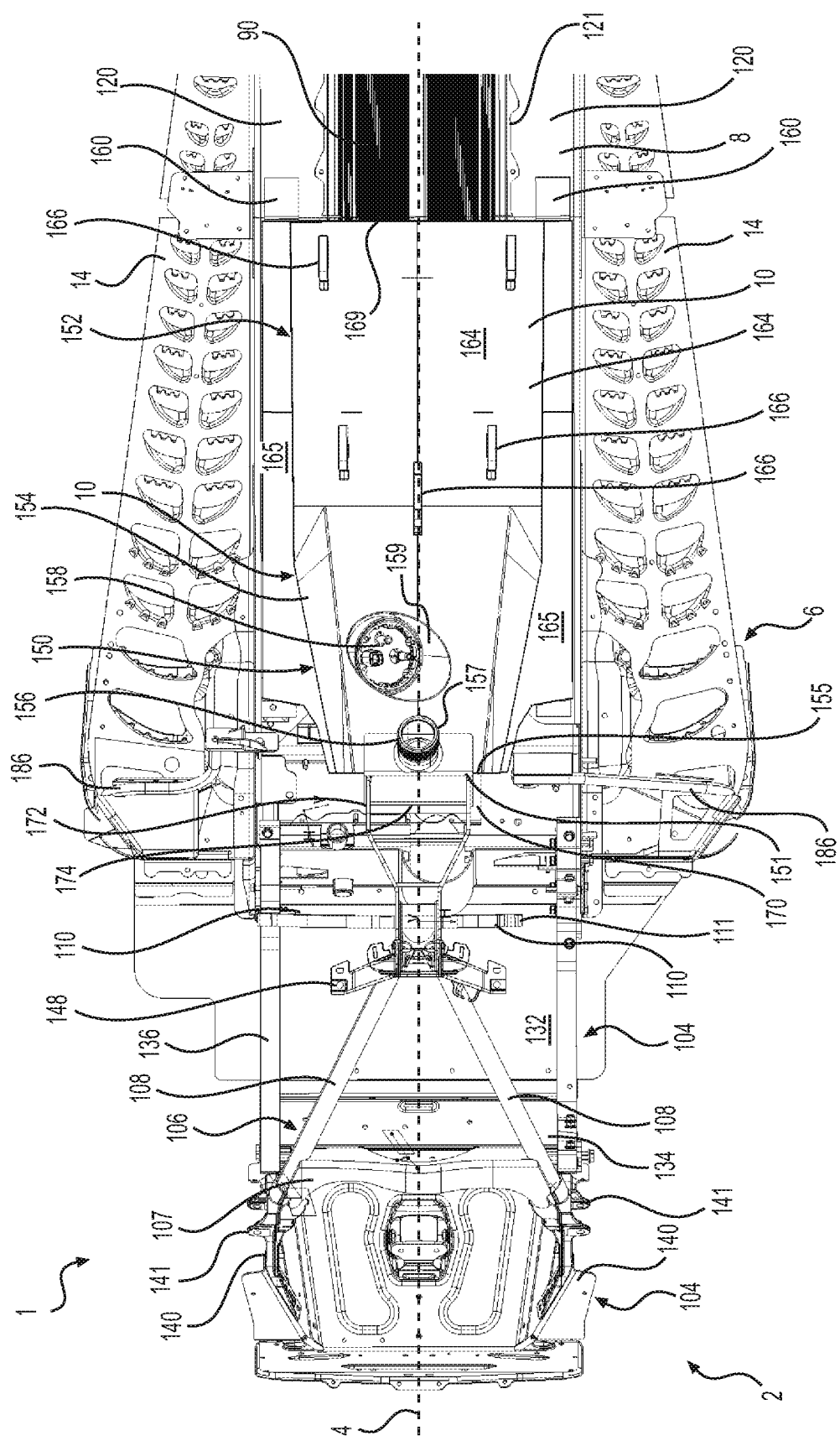
FIG. 5 is a top plan view of the portion of the snowmobile frame of FIG. 4.

With reference to FIG. 5, a pyramidal structure is formed by the cooperating components of the frame 6, namely the fuel tank 10, the forward supports braces 108 and the tunnel 8, engine cradle 102 and the front suspension module 104. The contact area between the fuel tank 10 and the tunnel 8 is larger than the contact area between the fuel tank 10 and the forward support braces 108. The fuel tank 10 tapers in width as it rises upwards from the tunnel 8 toward the connection 151 with the fuel tank bracket 170, and from the connection 151 toward the connection with the forward support braces 108. This pyramidal structure greatly increases the torsional rigidity of the frame 6 about an axis perpendicular to the front drive axle axis 46a, over frames without a pyramidal structure.

With reference to FIG. 3B, the cooperation between the forward supports braces 108, the fuel tank 10 and the tunnel 8, engine cradle 102 and the front suspension module 104 forms a generally triangular structure which greatly increases the resistance to bending along an axis parallel to the front drive axle axis 46a.

With reference to FIG. 3B, a hook 178 is attached to a left side of the left arm 172 of the fuel tank bracket 170 as best seen in FIGS. 2 and 3A. The hook 178 supports the muffler 58' which is suspended therefrom. It is contemplated that a snowmobile component other than the muffler 58' means could be supported by the hook 178. It is contemplated that attachments means other than the hook 178 could be provided on the fuel tank bracket 170 or other parts of the fuel tank 10, such as the front surface 168, for attaching and supporting other components of the snowmobile 1.

A support member 110 extends upwards from the engine cradle 102 to the fuel tank 10. The support member 110 has a vertical portion with its lower end attached by fasteners 112 to the upper bar 136 on the right side of the engine cradle 102. The support member 110 has a horizontal portion connected to its vertical portion and attached to the fuel tank 10 via the fuel tank bracket 170. The horizontal portion of the support member 110 extends further leftwards from the fuel tank bracket 170 towards the left side of the snowmobile 1. The left end 111 of the support member 110 has a hook-like structure for attaching and supporting snowmobile components, such as the housing (not shown) of the CVT 52. The support member 110 provides additional rigidity to the frame 6. It is also contemplated that the support member 110 could be shaped differently and could be used to support a plurality of snowmobile components such as the CVT housing. It is also contemplated that the support member 110 could be attached at a different location of the fuel tank 10 and/or engine cradle 102, for example, the bottom portion of the engine cradle 102 or directly to the reservoir body of the fuel tank 10. The support member 110 could also be attached to the tunnel 8 instead of, or in addition to, the fuel tank 10 and the engine cradle 102.

The fuel tank 10 described herein is a structural fuel tank 10, providing a very stable and rigid support structure for the snowmobile 1, with enhanced torsional and structural rigidity. The structural fuel tank 10 prevents bending or torsion between the tunnel 8 and the engine cradle 102 and/or the front suspension module 104. The frame 6, as described herein, thus minimizes torsional bending in the snowmobile 1, and prevents transmission of bending moments from the front 2 to rear 3 of the snowmobile 1. Additionally, the snowmobile 1 is made lighter in weight and stronger in structure by using the frame 6 and the fuel tank 10 as described herein.

Figure 9:
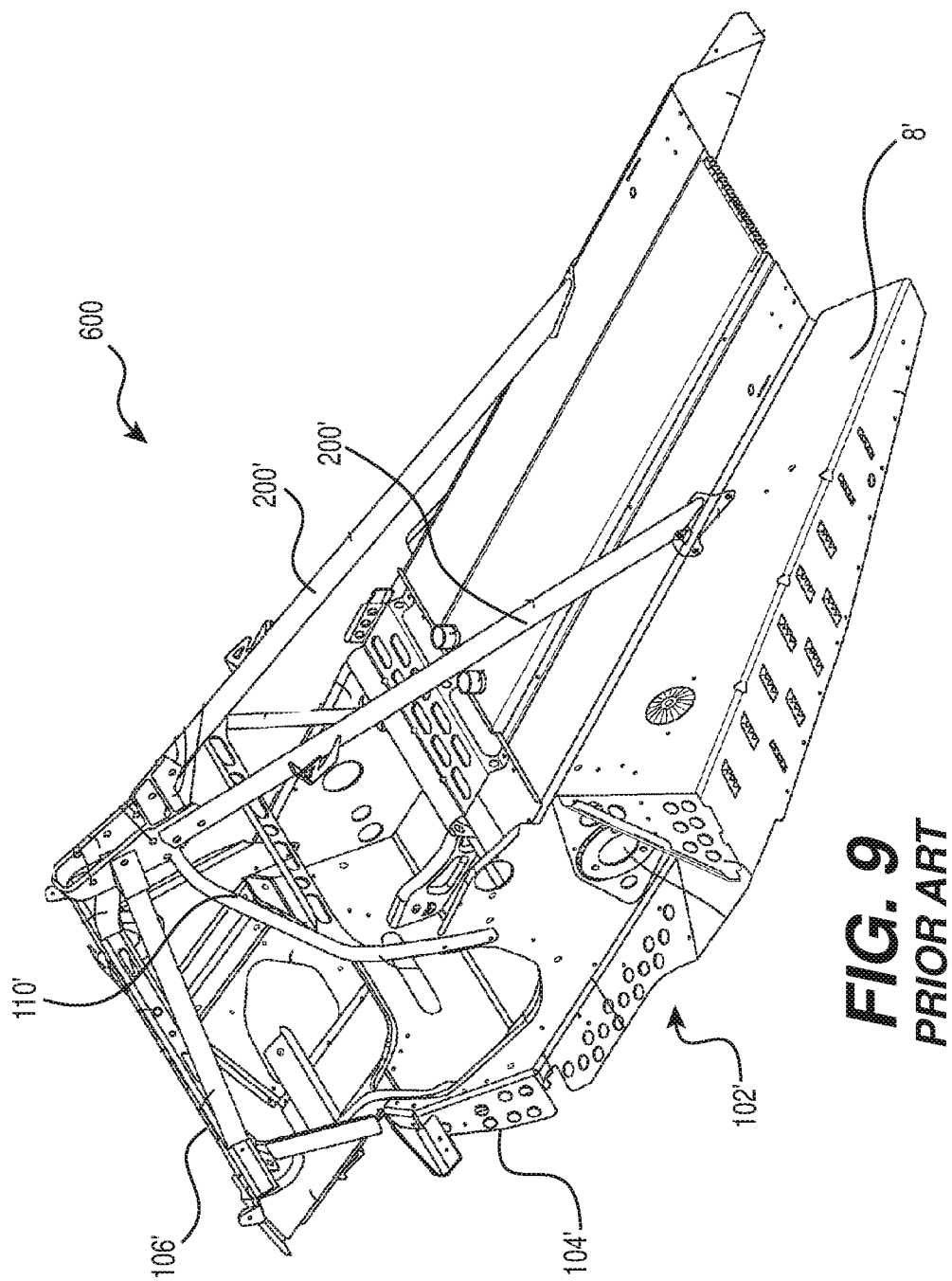
FIG. 9 is a perspective view, taken from a rear, left side, of a prior art snowmobile frame.

FIG. 9, shows the frame 600 of a prior art snowmobile. U.S. Pat. No. 7,469,764 B2, issued Dec. 30, 2008, provides additional details of the prior art frame 600 described herein. The frame 600 shows a tunnel 8', an engine cradle 102', a front suspension module 104', a forward support 106' extending upwards and rearwards from the front suspension module 104', and a support member 110' connected to the engine cradle 102' at both ends. The frame 600 further includes a pair of rear support braces 200' extending upwards from the tunnel 8'. The forward support braces 102' and the rear support braces 200' are attached together at the top forming a pyramidal structure. The fuel tank (not shown in FIG. 9) is disposed on the upper surface of the tunnel 8' between the rear support braces 200'. The fuel tank, however, is not connected to other parts of the frame structure 600 and does not form a part of the support structure of the snowmobile (not shown).

Incorporating the fuel tank 10 into the frame 6 as described herein allows for elimination of the rear support braces 200' from the frame structure 6 without subtracting from the rigidity or the stability of the frame 6 and of the snowmobile 1. A reduction of components without loss of functionality enables a cheaper and more efficient manufacturing process. Elimination of the rear support braces 200' and incorporation of the fuel tank into the frame 6 simplifies assembly and disassembly of the snowmobile and also provides more flexibility in the configuration of its components and their placement in the snowmobile relative to each other.

Figure 10:
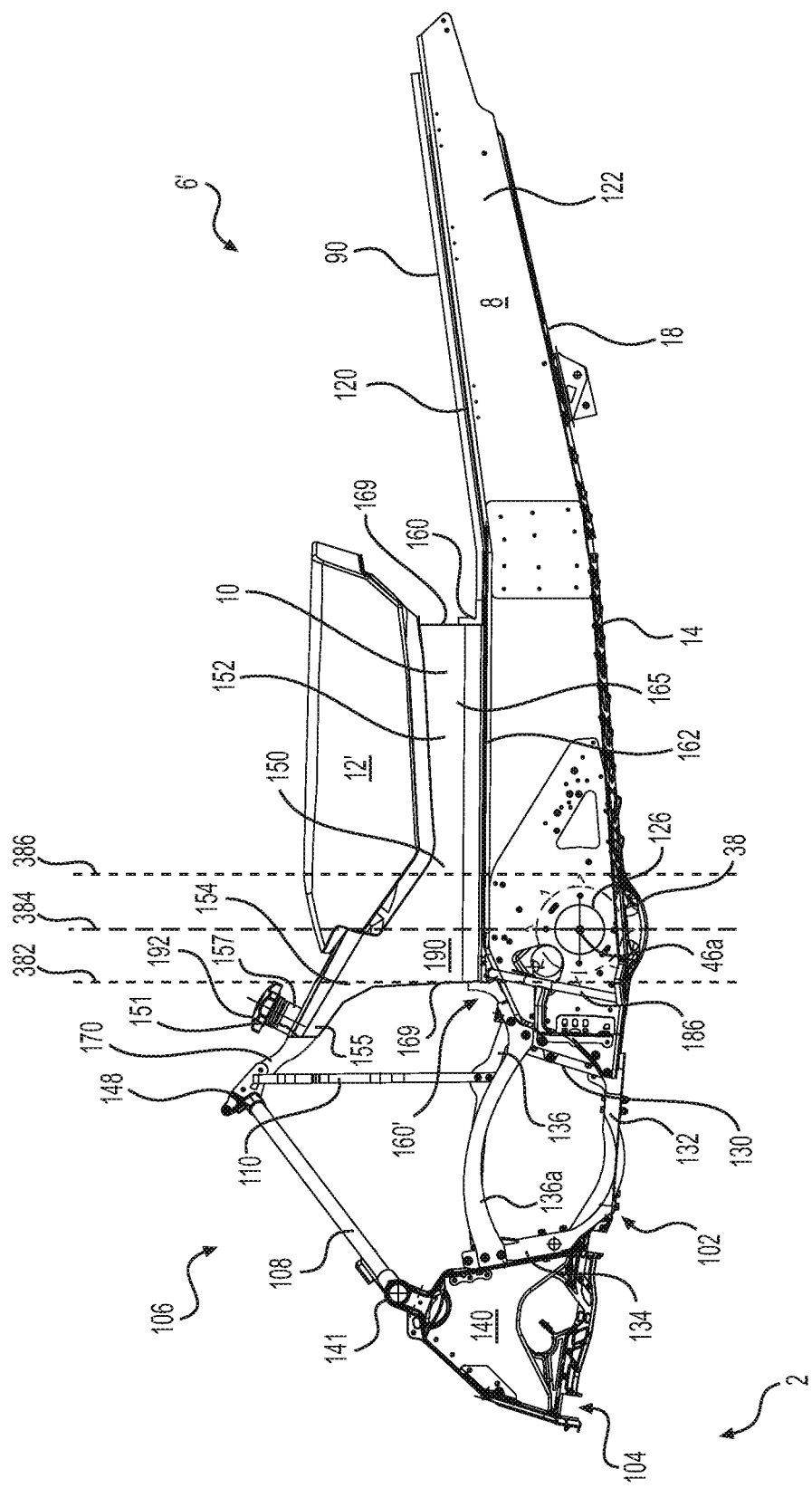
FIG. 10 is a left side elevation view of a portion of another embodiment of a snowmobile frame.

FIG. 10 shows another embodiment of the snowmobile frame 6'. The frame 6' has the same components as the frame 6 shown in FIGS. 2 to 8. Corresponding and similar elements of the frame 6' and the frame 6 will be labeled using the same reference numbers for simplicity, and will not be described again in detail. Elements of the frame 6' that are different from the corresponding elements of the frame 6 will be labeled using the same reference number and an apostrophe added thereafter.

The fuel tank 10 of the frame 6' is substantially similar to the fuel tank 10 of the frame 6 but is positioned further forward on the tunnel 8 than in the frame 6 of the preceding FIGS. 2 to 8. The front edge of the bottom surface 162 of the fuel tank 10 thus extends forwardly of the front edge of the top surface 120 of the tunnel 8. The connection 151 between the fuel container 150 and the fuel tank bracket 170 has a longitudinal position forward of the plane 382 containing the front edge of the sprocket wheel 38 as well as the footrest support 186.

A tunnel attachment bracket 160' removably secures together the front portions of the fuel tank 10 and the tunnel 8. One portion of the tunnel attachment bracket 160' is fastened to the corner of the front surface 168 and another portion tunnel attachment bracket 160' is fastened to the top edge of the corresponding side surface 122, 124. The two portions of the tunnel attachment bracket 160' are disposed at an obtuse angle with respect to each other. The upper end of the footrest support 186 is disposed in a gap formed between the tunnel attachment bracket 160', the front edge of the tunnel side surface 122, 124, and the bottom surface 162 of the fuel tank 10. The rear portion of the fuel tank 10 is fastened to the tunnel 8 by an L-shaped tunnel attachment bracket 160 similar to that used for the frame 6.

The fill tube 157 and the fuel inlet 156 of the fuel tank 10 are disposed longitudinally forward of the plane 384 containing the drive axle rotational axis 46a as well as the drive sprocket 38. The fill tube 157 and the fuel inlet 156 are also longitudinally forward of the footrest support 186.

The seat 12' is longer than the seat 12 of the frame 6. The seat 12' is positioned such that the front end of the seat 12' is longitudinally further forward than the front end of the seat 12 as seen in FIG. 3B. The seat 12' is disposed rearward of the fuel inlet 156. The seat 12' of the frame 6' extends forward of the fuel pump opening 159 and the fuel pump 158 (shown schematically in dotted lines in FIG. 10). The fuel pump opening 159 and the fuel pump 158 are positioned above the drive sprocket 38 so as to be longitudinally between the planes 382 and 386 respectively containing the front and rear edges of the drive sprocket 38.

FIG. 11 shows yet another embodiment of the snowmobile frame 6". Corresponding and similar elements of the frame 6" and the frames 6 of FIGS. 2 to 8 will be labeled using the same reference numbers for simplicity, and will not be described again in detail. Elements of the frame 6" that are different from the corresponding elements of the frame 6 will be labeled using the same reference number and two apostrophes added thereafter. The fuel tank 10" is disposed further forwardly than the fuel tank 10 in the frame 6 of FIGS. 2 to 8. The fuel tank 10" is disposed further forwardly than the fuel tank 10 in the frame 6' of FIG. 10. In the frame 6" of FIG. 11, the front edge of the bottom surface 162 of the fuel tank 10" is disposed forward of the footrest support 186. The front edge of the bottom surface 162 of the fuel tank 10" is therefore disposed further forward with respect to the front edge of the top surface 120 of the tunnel 8 than the fuel tank 10 in the frame 6' of FIG. 10.

The fuel tank 10" of the frame 6" has a larger fuel container 150" than the fuel container 150 of the fuel tank 10. The front surface 168" of the fuel tank 10" bulges outwardly in the neck portion 154". The upper end 155 of the neck portion 154" of the fuel container 150" extends further forwardly and upwardly towards the steering bracket 148 than the neck portion 154 of the fuel tank 10 of either the frame 6 or the frame 6'. The fuel container 150" extends almost up to the same level as the steering bracket 148 in the vertical direction. The connection 151 between the fuel container 150 and the fuel tank bracket 170 has a longitudinal position forward of the plane 382 containing the front edge of the sprocket wheel 38 as well as the footrest support 186. The fuel tank bracket 170" connecting the neck portion 154" to the steering bracket 148 is thus correspondingly much shorter in length than the fuel tank bracket 170 of the fuel tank 10. The fuel tank bracket 170" comprises a pair of parallel longitudinal arms 172" connected by a single brace 174".

A tunnel attachment bracket 160" removably secures together the front portions of the fuel tank 10" and the tunnel 8 as in frame 6' of FIG. 10. One portion of the tunnel attachment bracket 160" is fastened to the corner of the front surface 168 and another portion tunnel attachment bracket 160" is fastened to the top edge of the corresponding side surface 122, 124. The two portions of the tunnel attachment bracket 160" are disposed at an obtuse angle with respect to each other. The upper end of the footrest support 186 is disposed in a gap formed between the tunnel attachment bracket 160', the front edge of the tunnel side surface 122, 124, and the bottom surface 162 of the fuel tank 10. The rear portion of the fuel tank 10 is fastened to the tunnel 8 by an L-shaped tunnel attachment bracket 160 similar to that used for the frame 6.

The fill tube 157 and the fill inlet 156 of the fuel tank 10 are disposed longitudinally forward of the plane 384 containing the drive axle rotational axis 46a and longitudinally rearward of the plane 382 containing the front edge of the drive sprocket 38 as can be seen in FIG. 11B. The fill tube 157 and the fill inlet 156 are generally aligned with the footrest support 186 in the longitudinal direction. The fuel pump opening 159 is generally positioned longitudinally between the planes 382 and 386 respectively containing the front and rear ends of the drive sprocket 38. The fuel pump opening 159 is longitudinally rearward of the plane 384 containing the drive axle rotational axis 46a.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A snowmobile comprising:
   a frame;
   a seat connected to the frame;
   at least one ski;
   a steering assembly operatively connected to the at least one ski to steer the snowmobile;
   a front suspension assembly connected to the frame and the at least one ski;
   a rear suspension assembly connected to the frame;
   an endless track connected to the rear suspension assembly; and
   an engine operatively connected to the frame and the endless track;
   the frame comprising:
      a tunnel extending longitudinally;
      an engine cradle connected to the tunnel and extending forwardly therefrom; and
      a front suspension module connected to the engine cradle and extending forwardly therefrom, the front suspension module connected to the front suspension assembly;
      a forward support connected to at least one of the front suspension module and the engine cradle, the forward support extending rearwardly and upwardly from the at least one of the front suspension module and the engine cradle; and
      a fuel tank connected to the tunnel, the fuel tank extending forwardly and upwardly to connect to the forward support so as to form a structural connection between the tunnel and the forward support for transmitting loads therebetween,
      all loads from the front suspension module and the steering assembly travelling through the forward support and being directed to the fuel tank being transferred to the tunnel via the fuel tank.

2. The snowmobile of claim 1, wherein the fuel tank is removably connected to the tunnel and the forward support.

3. The snowmobile of claim 1, further comprising a radiator housed in the tunnel wherein:
   the tunnel comprises an upper surface, a portion of the radiator extending above the upper surface of the tunnel; and
   the fuel tank comprises a bottom surface, a portion of the bottom surface of the fuel tank being recessed to receive the portion of the radiator extending above the upper surface of the tunnel.

4. The snowmobile of claim 1, wherein each of the forward support and the fuel tank comprises an upper portion, the forward support and the fuel tank being connected together at their respective upper portions.

5. The snowmobile of claim 1, wherein the forward support and the fuel tank are connected together by a steering bracket, the steering bracket receiving therethrough a steering column connected to the at least one ski.

6. The snowmobile of claim 1, wherein:
   the forward support comprises a left support brace and a right support brace;
   each of the left and right support braces is connected to the front suspension module at a lower end;
   each of the left and right support braces is connected to the fuel tank at an upper end; and
   the left and right support braces and the fuel tank form a generally pyramidal structure.

7. The snowmobile of claim 1, wherein the fuel tank comprises:
   a fuel container connected to the tunnel; and
   a fuel tank bracket connecting the fuel container to the forward support.

8. The snowmobile of claim 7, wherein the fuel tank bracket is permanently fixed to the fuel container.

9. The snowmobile of claim 7, wherein the fuel container comprises a lower portion and a neck portion, the lower portion being connected to the tunnel and the neck portion having the fuel tank bracket connected thereto.

10. The snowmobile of claim 9, wherein a lateral direction width of the neck portion is smaller than a lateral direction width of the lower portion.

11. The snowmobile of claim 7, wherein the fuel tank bracket comprises two arms extending between the fuel container and the forward support, the two arms being laterally spaced apart at least in a portion thereof proximate the fuel container.

12. The snowmobile of claim 1, wherein the forward support, the fuel tank, the tunnel, the engine cradle and the front suspension module form a generally triangular structure when viewed from a lateral side.

13. The snowmobile of claim 1, wherein the forward support, the fuel tank, the tunnel, the engine cradle and the front suspension module form a generally pyramidal structure when viewed from above.

14. A snowmobile comprising:
   a frame;
   a seat connected to the frame;
   at least one ski;
   a front suspension assembly connected to the frame and the at least one ski;
   a rear suspension assembly connected to the frame;
   an endless track connected to the rear suspension assembly; and
   an engine operatively connected to the frame and the endless track;
   the frame comprising:
      a tunnel extending longitudinally;

an engine cradle connected to the tunnel and extending forwardly therefrom; and a front suspension module connected to the engine cradle and extending forwardly therefrom, the front suspension module connected to the front suspension assembly;

a forward support connected to at least one of the front suspension module and the engine cradle, the forward support extending rearwardly and upwardly from the at least one of the front suspension module and the engine cradle; and a fuel tank connected to the tunnel, the fuel tank extending forwardly and upwardly to connect to the forward support so as to form a structural connection between the tunnel and the forward support for transmitting loads therebetween, the fuel tank comprising:

a fuel inlet, the fuel inlet being disposed longitudinally forward of the seat; and a fuel pump, the fuel pump being disposed longitudinally forward of the seat and longitudinally rearward of the fuel inlet.

15. The snowmobile of claim 14, wherein the fuel tank further comprises:

a fuel container connected to the tunnel, the fuel container having the fuel inlet; and a fuel tank bracket connecting the fuel container to the forward support, the fuel tank bracket being connected to the fuel container longitudinally forward of the fuel inlet.

16. The snowmobile of claim 15, further comprising a drive axle operatively connecting the engine to the endless track, the fuel tank bracket being connected to the fuel container longitudinally forward of the drive axle.

17. A frame for a snowmobile, the frame comprising:

a tunnel extending longitudinally;

an engine cradle connected to the tunnel and extending forwardly therefrom; and a front suspension module connected to the engine cradle and extending forwardly therefrom, the front suspension module being adapted to connect to a front suspension assembly;

a forward support connected to at least one of the front suspension module and the engine cradle, the forward support extending rearwardly and upwardly from the at least one of the front suspension module and the engine cradle; and a fuel tank connected to the tunnel, the fuel tank extending forwardly and upwardly to connect to the forward support such that loads transmitted through the forward support are directed to the tunnel through the fuel tank, all loads from the front suspension module travelling through the forward support and being directed to the tunnel being transferred to the tunnel via the fuel tank.

* * * * *